(12) United States Patent
Weissenborn et al.

(10) Patent No.: US 9,306,407 B2
(45) Date of Patent: Apr. 5, 2016

(54) BATTERY SYSTEM AND METHOD

(71) Applicant: Robert Bosch GmbH, Stuttgart (DE)

(72) Inventors: Erik Weissenborn, Stuttgart (DE); Martin Kessler, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 597 days.

(21) Appl. No.: 13/721,330

(22) Filed: Dec. 20, 2012

(65) Prior Publication Data

US 2013/0162045 A1 Jun. 27, 2013

(30) Foreign Application Priority Data

Dec. 22, 2011 (DE) .......................... 10 2011 089 655

(51) Int. Cl.
*H02J 7/00* (2006.01)

(52) U.S. Cl.
CPC ............. *H02J 7/0063* (2013.01); *H02J 7/0024* (2013.01); *Y02T 10/7055* (2013.01); *Y10T 307/653* (2015.04)

(58) Field of Classification Search
CPC .. H02J 7/0063; H02J 7/0024; Y10T 307/653; Y02T 10/7055
USPC .......................................................... 307/71
See application file for complete search history.

(56) References Cited

U.S. PATENT DOCUMENTS

| 6,430,692 | B1 * | 8/2002 | Kimble et al. | 713/300 |
| 6,577,087 | B2 | 6/2003 | Su | |
| 2009/0042073 | A1 * | 2/2009 | Kim et al. | 429/23 |
| 2009/0085553 | A1 * | 4/2009 | Kumar et al. | 323/351 |
| 2011/0130721 | A1 * | 6/2011 | Foster et al. | 604/151 |
| 2012/0013180 | A1 * | 1/2012 | Muto et al. | 307/9.1 |

FOREIGN PATENT DOCUMENTS

WO    WO 2010116671 A1 * 10/2010

* cited by examiner

*Primary Examiner* — Scott Bauer
(74) *Attorney, Agent, or Firm* — Michael Best & Friedrich LLP

(57) ABSTRACT

A battery system comprising at least two battery modules, wherein each battery module consists of at least one battery and a controllable first switching apparatus, which is designed to connect the respective battery module into a current path of the battery system or to electrically bridge the respective battery module, comprising at least one controllable second switching apparatus, which is designed to electrically connect the at least two battery modules in parallel or in series and comprising a control device, which is designed to control the controllable first switching apparatuses and the controllable second switching apparatus as a function of the requested electrical power. In addition, the present invention discloses a method of operating a battery system.

11 Claims, 2 Drawing Sheets

BATTERY SYSTEM AND METHOD

BACKGROUND OF THE INVENTION

It is becoming apparent that electronic systems, which combine new storage technologies with electrical drive engineering, will increasingly be used in the future in both stationary applications, as, e.g. wind turbines, and motor vehicles, such as hybrid and electric vehicles. In conventional applications, an electric machine, which, for example, is embodied as an induction machine, is controlled via an electric energy converter in the form of an inverter. A distinguishing characteristic for such systems is a so-called DC intermediate circuit, via which an energy storage unit, typically a battery, is connected to the DC side of the inverter. In order to be able to fulfill the power and energy requirements given for a respective application, a plurality of battery cells are connected in series. Because the current provided by an energy storage unit of this kind has to flow through all of the battery cells and a battery cell can only conduct a limited amount of current, battery cells are often additionally connected in parallel in order to increase the maximum current.

Besides a high total voltage, the series circuit consisting of a plurality of battery cells creates the problem that the entire energy storage unit fails if a single battery cell fails. This results from battery current no longer being able to flow. Such a power outage of the energy storage unit can lead to a power outage in the entire system. In a motor vehicle, a power outage of the drive battery can lead to the "shutdown" of the vehicle. In other applications, as e.g. the rotor blade adjustment of wind turbines, damage to the wind turbines can even occur when unfavorable framework conditions exist, such as, for example, strong wind. For that reason, a high level of reliability of the energy storage unit should always be the objective of the technology, wherein "reliability" describes the capability of a system to work error-free for a predefined period of time.

In the case of the simple series circuit of a plurality of battery cells, the large spread of the voltage range across the varying states of charge of the battery cells furthermore leads to restrictions when designing the remaining system components in terms of efficiency, installation space and costs. Hence, the electric machine must, e.g., be designed such that a required output can also be supplied at the lower voltage limit, i.e. when the battery charge is low. On the other hand, said electric machine must be able to withstand the operation at the upper voltage limit, i.e. when the battery is fully charged.

The American patent application US 2002/0175644 A1 discloses a system for controlling a three-phase electrical machine, which has a controllable energy storage unit comprising DC voltage sources that can be connected and disconnected as well as an inverter connected downstream.

SUMMARY OF THE INVENTION

The invention provides accordingly for:
a battery system comprising at least two battery modules, wherein each battery module consists of at least one battery and a controllable first switching apparatus, which is designed for the purpose of connecting the respective battery module into a current path of the battery system or of electrically bridging the respective battery module. Provision is also made according to the invention for at least one controllable second switching apparatus, which is designed for the purpose of connecting the at least two battery modules in parallel and for a control device, which is designed for the purpose of controlling the controllable first switching apparatuses and the controllable second switching apparatus as a function of the required electrical power.

A method for operating a battery system according to the invention comprises the following steps: providing a battery system having at least two battery modules, which comprise at least one battery and in each case one first switching apparatus, and at least one second switching apparatus; connecting or bridging a battery module in a current path of the battery system by means of the respective first switching apparatus and as a function of the requested electrical power; controlling the first switching apparatuses and the second switching apparatus such that the at least two battery modules are connected electrically in parallel or in series.

Advantages of the Invention

The insight at the basis of the present invention is that conventional battery systems have an inflexible design.

The idea underlying the present invention consists therefore of taking this insight into account and providing a battery system in which individual battery modules can be flexibly connected to one another.

To this end, switching apparatuses are provided in individual battery modules, which each separately have at least one battery of their own. The switching apparatuses are designed such that the batteries can be connected into a current path by means of said switching apparatuses or can be bridged. If a plurality of such battery modules according to the invention are connected in succession, said battery modules can thereby when required be wired in series. It is therefore possible with the aid of the first switching apparatuses according to the invention to flexibly adjust the voltage in the current path of the battery system. The voltage in the current path can particularly be adjusted with the aid of the inventive first switching apparatuses such that a consumer load can thereby be directly operated and a voltage transformer, for example, is not necessary.

The present invention further provides at least one second switching apparatus, which is designed to connect to battery modules in parallel. If two or more battery modules are connected in parallel, the currents in the lines of the individual battery modules can be substantially reduced. In so doing, the ohmic line losses and the outlay for heat dissipation are significantly reduced in the individual battery modules and thereby in the entire battery system.

Without the parallel connection of the battery modules, the following power loss occurs:

$$Pv=R*I^2$$

wherein R is the internal resistance of a battery module.

In the case of a parallel connection of two modules, a reduced power loss results, which is described by the following equation:

$$Pv=2*R*(I/2)^2=0.5*R*I^2$$

Thus, a power loss reduced by 50% occurs. In a parallel connection of 3 battery modules, a power loss results, which is described by the following equation:

$$Pv=3*R*(I/3)^2=0.33*R*I^2$$

An ever smaller power loss thus occurs with an increasing number of battery modules connected in parallel.

Finally a control device is provided which controls the switching apparatuses.

Advantageous embodiments and modifications ensue from the dependent claims as well as from the description with reference to the figures.

In one embodiment, the first switching apparatus has a positive battery connection terminal, a negative battery connection terminal, a positive output terminal and a negative output terminal and is designed to electrically connect the positive battery connection terminal to the positive output terminal and to electrically connect the negative battery connection terminal to the negative output terminal, wherein the positive battery connection terminal can be electrically connected to a positive pole of the battery and the negative battery connection terminal can be electrically connected to a negative pole of the battery.

If, for example, an electrical DC consumer load is connected to the battery system, the first switching apparatuses can be embodied as so-called half-bridge switching apparatuses, as depicted in FIG. 4. Through the use of half-bridge switching apparatuses, which have two separate switching elements, it is possible to switch a plurality of battery modules in the same direction, i.e. with the same polarity, into the current path of the battery system and thereby vary the voltage applied to the outlets of the battery systems. In the ranges of low rotational speed, the full battery voltage is, e.g., not required at an electric motor. If a voltage is provided at the outlets of the battery system that is lower vis-B-vis the maximum voltage, lower switching losses in the inverter and a lower harmonic content of the phase voltage and the phase current in the motor result. This leads to an increased efficiency of the total system.

In one embodiment, the first switching apparatus is further designed to electrically connect the positive battery connection terminal to the negative output terminal and to electrically connect the negative battery connection terminal to the positive output terminal.

If the first switching apparatuses are embodied as so-called full bridge switching apparatuses, as depicted in FIG. 3, individual battery modules can also be connected with reverse polarity into the current path of a battery system. In order to do this, it is necessary to provide four separate switching elements in such a full bridge switching apparatus. It is thereby possible not only to provide different levels of voltage but also voltages of positive and negative polarity at the outlets of the battery system. The use of a plurality of battery systems according to the invention therefore makes it possible, for example, to directly actuate a three-phase motor. To this end, a battery system is provided for each phase of the motor, and the individual battery systems are actuated such that the necessary voltages are present at the outlets of the respective battery systems.

In one embodiment, the second switching apparatus comprises at least two module connections and a switching element for in each case two module connections, said switching element being designed to electrically connect the respective two module connections. In so doing, each module connection can be electrically connected to the positive pole of respectively a different battery module or each module connection can be electrically connected to the negative pole of the battery of respectively a different battery module.

If the second switching apparatus is constructed with simple switching elements, it is possible to provide very simple and favorable second switching apparatuses. If the number of module connections in a second switching apparatus is furthermore variably maintained, a second switching apparatus can be adapted to multiple applications. If a second switching apparatus comprises, e.g., four module connections and correspondingly two switching elements, three battery modules can, e.g., be connected in parallel. In a further embodiment, those connections, which are connected to the same battery pole of a battery, are electrically connected to one another within the second switching apparatus and are connected to the respective battery pole by means of a single module connection.

In one embodiment, a further second switching apparatus is provided and the module connections of the further second switching apparatus can be connected to the poles of the batteries of the battery module which in each case cannot be connected to the first second switching apparatus. If two second switching apparatuses are provided in order to connect two battery modules to one another, current flows through only four semiconductor switches of the first and second switching apparatuses when two battery modules are connected in parallel, particularly in a battery system comprising full bridge switching apparatuses. The power loss of the battery system according to the invention is thereby further reduced.

In one embodiment, the control of the first switching apparatuses and the second switching apparatus is executed such that the at least two battery modules are connected in parallel and the second switching apparatus is actuated in such a way that a current-limited voltage compensation takes place between the at least two battery modules. It is thereby possible to prevent damage to the battery modules as a result of currents that are too large.

The embodiments and modifications mentioned above can be, where applicable, arbitrarily combined with one another. Further possible embodiments, modifications and implementations of the invention also do not comprise explicitly mentioned combinations of features of the invention, which have been previously or will be subsequently described with regard to the exemplary embodiments. The person skilled in the art will also thereby add individual aspects as improvements of supplements to the respective basic form of the present invention.

BRIEF DESCRIPTION OF THE DRAWINGS

The present invention is described below in detail using the exemplary embodiments specified in the schematic figures of the drawings. In the drawings.

Elements and apparatuses which are the same or functionally the same have been provided with the same reference numerals, provided nothing different is specified.

DETAILED DESCRIPTION

Figure 1:
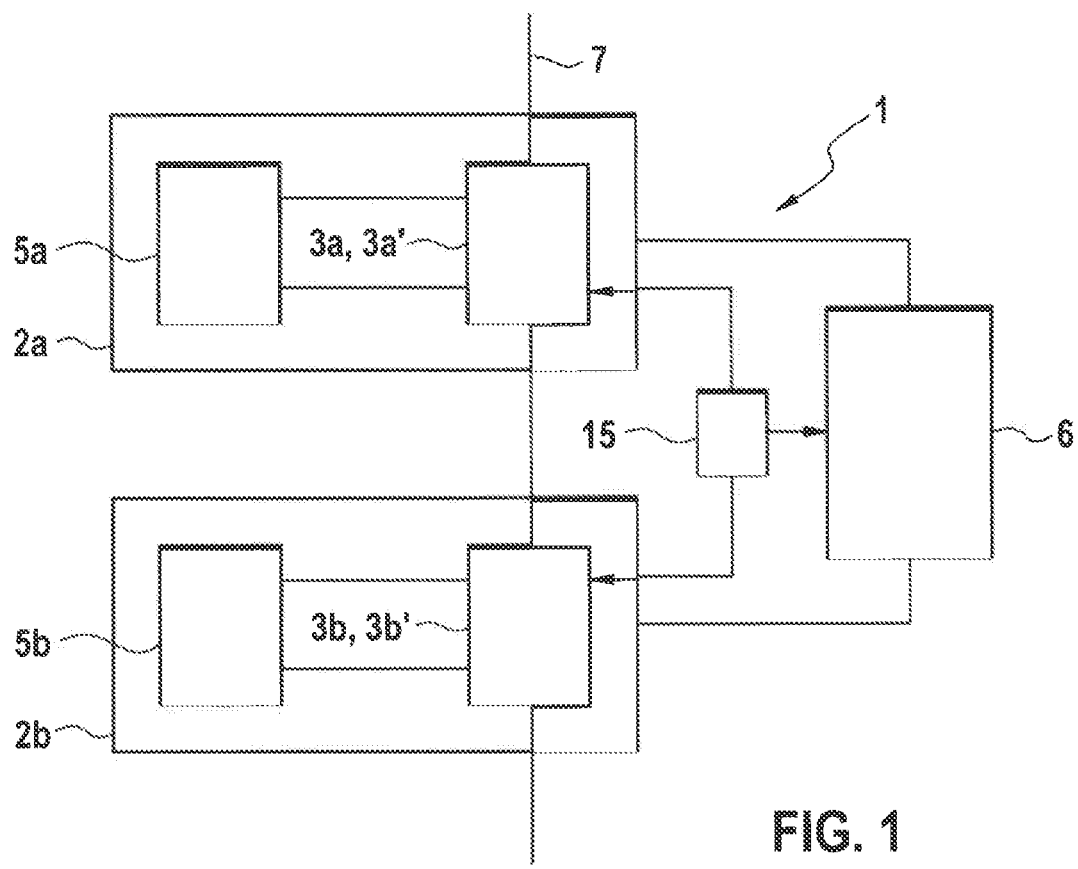
FIG. 1 shows a block diagram of an exemplary embodiment of a battery system 1 according to the invention.

FIG. 1 shows a block diagram of an exemplary embodiment of a battery system 1 according to the invention.

The battery system 1 comprises two battery modules 2a and 2b. Each battery module 2a, 2b has a battery 5a, 5b, which is connected to a first switching apparatus 3a, 3a', 3b, 3b'. The battery system 1 has further a second switching apparatus 6, which is connected to the two battery modules 2a, 2b. A control device 15 is furthermore provided in the battery system 1, said control device being connected to the first switching apparatuses 3a, 3a', 3b, 3b' and the second switching apparatus 6 in order to control said apparatuses as a function of a requested electrical power. The battery system 1 finally comprises a current path 7, which connects both first switching devices 3a, 3a', 3b, 3b' among one another and the battery system 1 to the environment thereof.

In FIG. 1, the battery modules 2a and 2b have, for example, a voltage of respectively 200 volts. Different outlet voltages thus result at the current path 7 of the battery system 1. If the control device 15 actuates, e.g., the first switching apparatuses 3a, 3a' such that the same connect the battery 5a into the current path 7 and the first switching apparatus 3b, 3b' such that the same does not connect the battery 5a into the current path 7 but bridges said battery, a voltage of 200 volts results at the current path 7. If a very high current is requested across the current path 7, the control device 15 can actuate the second switching apparatus 6 and the first switching apparatus 3b, 3b' in such a way that said switching apparatuses connect the battery 5b in parallel with the battery 5a.

If on the other hand a higher voltage is required, the control device 15 can actuate the first switching apparatuses 3a, 3a', 3b, 3b' and the second switching apparatus 6 in such a way that the battery 5a and the battery 5b are connected in series in the current path 7. In so doing, a voltage of 400 volts results at the current path 7.

The control device 15 in FIG. 1 is embodied as a microcontroller 15, which is programmed to actuate the first switching apparatuses 3a, 3a', 3b, 3b' and the second switching apparatus 6.

In further embodiments, the control device 15 is integrated into a motor vehicle control device. In still further embodiments, the control device 15 is embodied as a computer program module which is stored in the storage of a vehicle control device and is executed by the processor of said vehicle control device.

Figure 2:
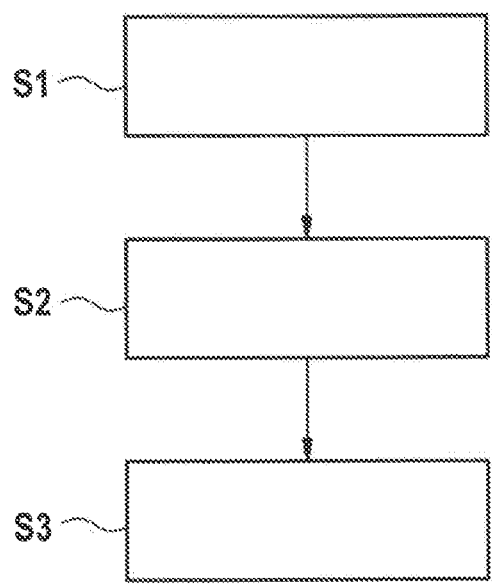
FIG. 2 shows a flow diagram of an exemplary embodiment of a method according to the invention.

FIG. 2 shows a flow diagram of an exemplary embodiment of a method according to the invention.

In the method for operating a battery system according to the invention, a battery system 1 comprising at least two battery modules 2a, 2b, which have at least one battery 5a, 5b and in each case a first switching apparatus 3a, 3b, 3a', 3b', and at least one second switching apparatus 6 is provided in a first step S1. In a second step S2, a battery module 2a, 2b is connected into a current path 7 of the battery system 1 by the respective first switching device 3a, 3b, 3a', 3b' or is bridged. Finally in a last step S3, the first switching apparatuses 3a, 3b, 3a', 3b' and the second switching apparatus 6 are controlled as a function of the requested electrical power such that the at least two battery modules 2a, 2b are electrically connected in parallel or in series.

In a further embodiment of the method according to the invention, the first switching apparatuses 3a, 3b, 3a', 3b' and the second switching apparatus 6 are controlled in such a way that at least two battery modules 2a, 2b are electrically connected in series into the current path 7 of the battery system 1.

In a further embodiment of the method according to the invention, the first switching apparatuses 3a, 3b, 3a', 3b' and the second switching apparatus 6 are controlled in such a way that at least two battery modules 2a, 2b are electrically connected in parallel into the current path 7 of the battery system 1.

In a further embodiment of the method according to the invention, the first switching apparatuses 3a, 3b, 3a', 3b' and the second switching apparatus 6 are controlled in such a way that at least two battery modules 2a, 2b are electrically connected in series into the current path 7 of the battery system and at least two battery modules 2a, 2b are electrically connected in parallel into the current path 7 of the battery system 1.

In a further embodiment of the method according to the invention the first switching apparatuses 3a, 3b, 3a', 3b' and the second switching apparatus 6 are controlled in such a way that an arbitrary number of battery modules 2a, 2b, which is greater than two, are electrically connected in series into the current path 7 of the battery system 1 and an arbitrary number of battery modules 2a, 2b, which is greater than two, is electrically connected in parallel into the current path 7 of the battery system 1.

Figure 3:
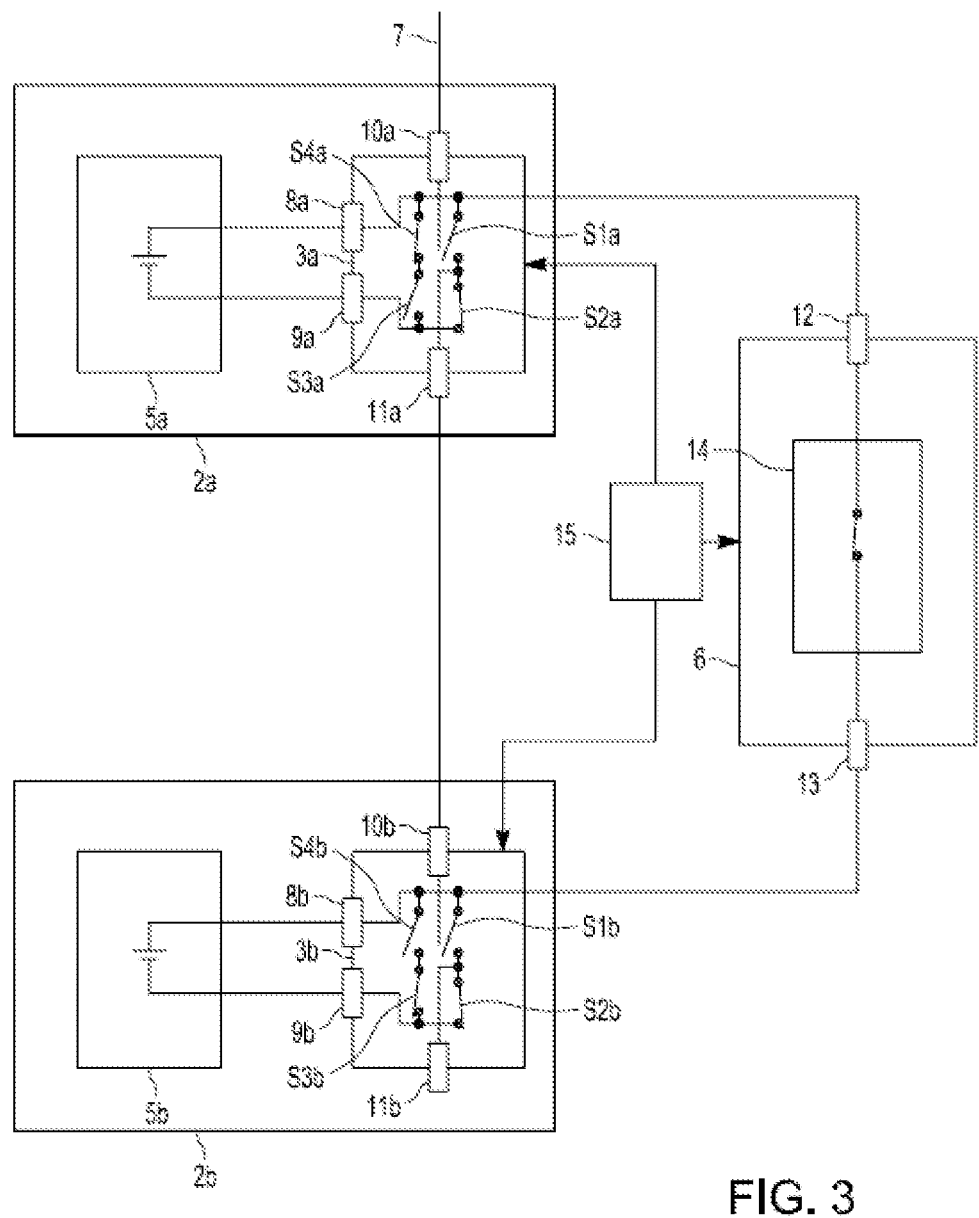
FIG. 3 shows a block diagram of a further exemplary embodiment of a battery system 1 according to the invention.

FIG. 3 shows a block diagram of a further exemplary embodiment of a battery system 1 according to the invention.

The battery system 1 in FIG. 3 differs from the battery system 1 in FIG. 1 in that the batteries 5a and 5b each comprise an individual battery having a positive and negative pole. In addition, the first switching apparatuses 3a, 3b each comprise a positive battery connection terminal 8a, 8b, a negative battery connection terminal 9a, 9b, a positive output terminal 10a, 10b and a negative output terminal 11a, 11b.

The first switching apparatuses 3a, 3b, 3a', 3b' furthermore have in each case four switching elements S1a, S2a, S3a, S4a and S1b, S2b, S3b, S4b. The switching elements S1a and S2a or respectively S1b and S2b as well as the switching elements S3a and S4a or respectively S3b and S4b are thereby in each case arranged in a series connection. The junction between the switching elements S1a and S2a is connected to the negative output terminal 11a, and the junction between the switching elements S1b and S2b is connected to the negative output terminal 11b. The junction between the switching elements S3a and S4a is connected to the positive output terminal 10a, and the junction between the switching elements S3b and S4b is connected to the positive output terminal 10b. Finally the terminals of the switching elements S1a and S4a or respectively S1b and S4b, which are not connected to the junctions between the switching elements S1a, S2a, S3a, S4a and S1b, S2b, S3b, S4b, are connected to the positive battery connection terminal 8a or respectively 8b; and the terminals of the switching elements S2a and S3a or respectively S2b and S3b, which are not connected to the junctions between the switching elements S1a, S2a, S3a, S4a and S1b, S2b, S3b, S4b, are connected to the negative battery connection terminal 9a or respectively 9b.

Finally the second switching apparatus 6 in FIG. 3 has a switching element 14, which is connected between the two module terminals 12, 13 of said second switching apparatus 6. The module terminal 12 is connected to the positive battery connection terminal 8a and the module terminal 13 is connected to the positive battery connection terminal 8b.

In FIG. 3, the switching elements S2a, S4a, S2b, S3b and 14 are closed. The switching elements S1a, S3a, S1b, S4b are open. By means of the switch settings depicted in FIG. 3, the two batteries 5a and 5b are electrically connected in parallel and are connected with positive polarity into the current path 7 of the battery system.

Should the two batteries 5a and 5b, e.g., be connected in series with positive polarity into the current path 7, the control device 15 controls the switching elements S1a, S2a, S3a, S4a, S1b, S2b, S3b, S4b and 14 in such a way that the switching elements S1a, S3a, S1b and S3b and 14 are open and the switching elements S2a, S4a, S2b, S4b are closed.

Should the two batteries 5a and 5b be connected in series with negative polarity into the current path 7, the control device 15 controls the switching elements S1a, S2a, S3a, S4a, S1b, S2b, S3b, S4b and 14 in such a way, that the switching elements S2a, S4a, S2b, S4b and 14 are open and the switching elements S1a, S3a, S1b and S3b are closed.

Should the two batteries 5a and 5b be connected in parallel and with negative polarity into the current path 7, the control device 15 controls the switching elements S1*a*, S2*a*, S3*a*, S4*a*, S1*b*, S2*b*, S3*b*, S4*b* in such a way that the switching elements S1*a*, S4*a*, S2*b* and S4*b* are open and the switching elements S2*a*, S3*a*, S1*b* and S3*b* and 14 are closed.

The switching elements S1*a*, S2*a*, S3*a*, S4*a*, S1*b*, S2*b*, S3*b*, S4*b* and 14 are embodied as MOSFETs. In further embodiments, the switching elements S1*a*, S2*a*, S3*a*, S4*a*, S1*b*, S2*b*, S3*b*, S4*b* and 14 are designed as arbitrary semiconductor switches. In still further embodiments, the switching elements S1*a*, S2*a*, S3*a*, S4*a*, S1*b*, S2*b*, S3*b*, S4*b* and 14 are embodied as semiconductor relays, relays or the like.

In a further embodiment, the battery modules 2*a*, 2*b* have in each case at least two batteries 5*a*, 5*b*, which are connected to one another in series.

Figure 4:
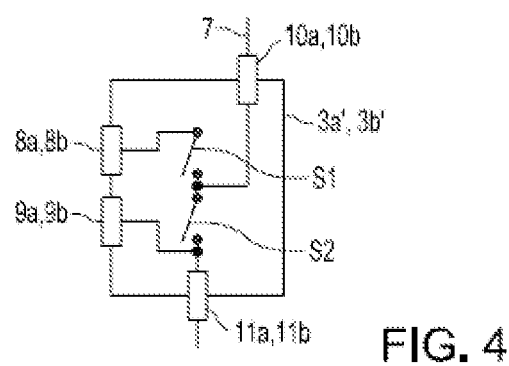
FIG. 4 shows a block diagram of an exemplary embodiment of a first switching apparatus 3a, 3a', 3b. 3b', as said apparatus can be used in a battery system 1 according to the invention.

FIG. 4 shows a block diagram of an exemplary embodiment of a first switching apparatus 3*a*', 3*b*', as said apparatus can be used in a battery system according to the invention.

In contrast to the switching apparatuses 3*a*, 3*b* in FIG. 3, the switching device 3*a*', 3*b*' in FIG. 4 has only two switching elements S1 and S2, which together form a half-bridge switching apparatus 3*a*', 3*b*'.

In FIG. 4, the two switching elements S1, S2 are connected in series. In addition, a junction between said two switching elements S1, S2 is connected to a positive output terminal 10*a*, 10*b*. In addition, the terminal of the first switching element S1, which is not connected to the junction, is connected to the positive battery connection terminal 8*a*, 8*b* and the terminal of the second switching element S2, which is not connected to the junction, is connected to the negative battery connection terminal 9*a*, 9*b*.

A battery module 2*a*, 2*b* can be connected in series into the current path 7 or can be bridged with a switching apparatus as depicted in FIG. 4. A reversal of polarity of the battery module 2*a*, 2*b* is not possible. This facilitates providing a battery module 2*a*, 2*b* adapted to the respective application and saving on components in applications that do not require the function of reversing polarity.

Although the present invention was previously described using preferred exemplary embodiments, it is not limited to said embodiments but can be modified in a variety of ways. The invention can particularly be changed or modified in multiple ways without deviating from the quintessence of the invention.

In an exemplary embodiment, the control device 15 controls the switching apparatuses 3*a*, 3*b*, 3*a*', 3*b*', 6 in a parallel circuit of two or several battery modules 2*a*, 2*b* such that a voltage compensation takes place between the battery modules 2*a*, 2*b*; and at the same time, the compensating currents between the battery modules 2*a*, 2*b* are limited.

In one embodiment, a first battery module 2*a*, 2*b* is initially connected into the current path 7, which module has a higher voltage than a second battery module 2*b*, 2*a*. The second battery module 2*b*, 2*a* is thereupon connected in parallel to the first battery module 2*a*, 2*b* by means of the second switching apparatus 6. The switching element 14 is thereby clocked in such a way that the current, which flows between the two battery modules 2*a*, 2*b* as compensating current, does not exceed a maximum value for the compensating current. As soon as both battery modules 2*a*, 2*b* have the same output voltage, the switching element 14 can stay permanently closed. If the second battery module 2*b*, 2*a* has the higher output voltage, the first battery module 2*a*, 2*b* is connected in parallel to the second battery module 2*b*, 2*a* in a correspondingly clocked manner.

In a further embodiment, the voltage difference of the two battery modules 2*a*, 2*b* is compensated by the battery module 2*a*, 2*b*, which has the lower output voltage, being inversely connected into the current path 7. This type of voltage compensation can then be used if the voltage difference is less than the flux voltage of the diode path of the semiconductor switching elements S1*a*, S2*a*, S3*a*, S4*a*, S1*b*, S2*b*, S3*b*, S4*b*. In this case, the compensating current, which flows between the battery modules 2*a*, 2*b*, corresponds to the phase current, and therefore a further measure for current limitation and the resultant avalanche losses are eliminated.

In a further embodiment, the switching on and off of battery modules 2*a*, 2*b*, which are connected in parallel, takes place at the zero crossing of the current in the current path 7 in order to avoid losses due to the avalanche effect.

The invention claimed is:

1. A battery system having two battery modules, wherein each battery module comprises:
    at least one battery;
    a controllable first switching apparatus, which is designed to connect the respective battery module into a current path of the battery system in normal polarity and reverse polarity or to electrically bridge the respective battery module;
    at least one controllable second switching apparatus, which is designed to electrically connect the at least two battery modules in parallel; and
    a control device, which is designed to control the controllable first switching apparatus and the controllable second switching apparatus as a function of a requested electrical power.

2. The battery system according to claim 1, wherein the first switching apparatus comprises a positive battery connection terminal, a negative battery connection terminal, a positive output terminal and a negative output terminal and is designed to electrically connect the positive battery connection terminal to the positive output terminal and to electrically connect the negative battery connection terminal to the negative output terminal, wherein the positive battery connection terminal can be electrically connected to a positive pole of the battery and the negative battery connection terminal can be connected to a negative pole of the battery.

3. The battery system according to claim 2, wherein the first switching apparatus is further designed to electrically connect the positive battery connection terminal to the negative output terminal and to electrically connect the negative battery output terminal to the positive output terminal.

4. The battery system according to claim 1, wherein the second switching apparatus comprises at least two module terminals and a switching element for each two module terminals, said switching element being designed to electrically connect the respective two module terminals; wherein each module terminal can be electrically connected to the positive pole of the battery of respectively a different battery module or wherein each module terminal can be electrically connected to the negative pole of the battery of respectively a different battery module.

5. The battery system according to claim 4, wherein a further second switching apparatus is provided and wherein the module terminals of the further second switching apparatus can be electrically connected to the poles of the batteries of the battery module which poles in each case cannot be connected to the first second switching apparatus.

6. A method for operating a battery system, comprising the steps:
    providing a battery system comprising at least two battery modules, which consist of at least one battery and in each case a first switching apparatus, and comprising at least one second switching device;

connecting in normal polarity and reverse polarity or bridging a battery module in a current path of the battery system by means of the respective first switching apparatus;

controlling the first switching apparatuses and the second switching device as a function of a requested electrical power such that the at least two battery modules are electrically connected in parallel or in series.

7. The method according to claim 6, wherein a positive battery connection terminal of the first switching apparatus is electrically connected to a positive outlet connection of said first switching apparatus or is disconnected from the same, and a negative battery connection terminal of said first switching apparatus is electrically connected to a negative output terminal of said first switching apparatus or is disconnected from the same; and wherein the positive battery connection terminal is electrically connected to a positive pole of the battery and the negative battery connection terminal is electrically connected to a negative pole of the battery.

8. The method according to claim 7, wherein the positive battery connection terminal of the first switching apparatus is electrically connected to the negative output terminal of said first switching apparatus or disconnected from the same, and the negative battery connection terminal of said first switching apparatus is electrically connected to the positive output terminal of said first switching apparatus or disconnected from the same.

9. The method according to claim 6, wherein at least two module terminals are provided in the second switching apparatus and one switching element is provided in each case for each two module terminals, wherein the switching element electrically connects or disconnects the respective two module terminals;

wherein each module terminal is electrically connected to the positive pole of the battery of respectively a different battery module or wherein each module terminal is electrically connected to the negative pole of the battery of respectively a different battery module.

10. The method according to claim 9, wherein a further second switching apparatus is provided and wherein the module terminals of the further second switching apparatus are electrically connected to the poles of the batteries of the battery modules which poles in each case are not connected to the first second switching apparatus.

11. The method according to claim 6, wherein the control of the first switching apparatuses and the second switching apparatus is executed such that the at least two battery modules are electrically connected in parallel and the second switching apparatus is actuated in such a way that a current-limited voltage compensation takes place between the at least two battery modules.

* * * * *